United States Patent [19]

Gottschalk et al.

[11] Patent Number: 5,750,621
[45] Date of Patent: May 12, 1998

[54] MULTIPHASE POLYMER BLENDS

[75] Inventors: Axel Gottschalk, Neustadt; Raimund Stadler, Mommenheim; Udo Krappe, Mainz, all of Germany

[73] Assignee: BASF Aktiengesellschaft, Ludwigshafen, Germany

[21] Appl. No.: 737,482

[22] PCT Filed: May 3, 1995

[86] PCT No.: PCT/EP95/01668

§ 371 Date: Nov. 13, 1996

§ 102(e) Date: Nov. 13, 1996

[87] PCT Pub. No.: WO95/31503

PCT Pub. Date: Nov. 23, 1995

[30] Foreign Application Priority Data

May 13, 1994 [DE] Germany ............ 44 16 854.3

[51] Int. Cl.$^6$ .................. C08L 71/12; C08L 53/02; C08L 53/00
[52] U.S. Cl. ............... 525/68; 525/71; 525/89; 525/90; 525/91; 525/92 D; 525/94
[58] Field of Search .................. 525/68, 71, 89, 525/90, 91, 92 D, 94

[56] References Cited

U.S. PATENT DOCUMENTS

| | | | |
|---|---|---|---|
| 3,833,687 | 9/1974 | Lee | 260/876 |
| 4,258,144 | 3/1981 | Childers | 525/91 |
| 4,366,289 | 12/1982 | Keskkula | 525/94 |
| 4,716,199 | 12/1987 | van der Meer | 525/92 D |
| 5,091,473 | 2/1992 | Arashiro | 525/133 |

FOREIGN PATENT DOCUMENTS

| | | | |
|---|---|---|---|
| 099062 | 1/1984 | European Pat. Off. | |
| 442180 | 8/1991 | European Pat. Off. | |
| 3819744 | 12/1989 | Germany | |
| 021442 | 2/1982 | Japan | 525/71 |
| 021443 | 2/1982 | Japan | 525/71 |
| 1054052 | 8/1987 | Japan | |
| 93/03291 | 2/1993 | WIPO | |

OTHER PUBLICATIONS

Ren "Hydrogenated Polybutadiene–Polymethyl Methacrylate Block Polymer" Journal of Polymer Science Part A 31(4); 1993 pp. 847–851.

Fayt "Molecular Design of Multicomponent Polymer Systems" Macromolecules 19(7); 1986 pp. 2077–2080.

Chemical Abstract 95:133837 (of JP56050958).

Won Ho Jo et al., Macromolecules, 1991, vol. 24, pp. 2231–2235.

*Primary Examiner*—David Buttner
*Attorney, Agent, or Firm*—Keil & Weinkauf

[57] ABSTRACT

Multiphase polymer blends contain a) a polymer (A), b) an A—B block copolymer (B) composed of a block A and a resilient block B and c) a B—C block copolymer (C) composed of a resilient block B and a block C d) and at least one further polymer (D) which differs from (A),(B) and (C) and is incompatible with the polymer (A), wherein the blocks A, B and C are different from one another, the polymer (A) is compatible with the block A and incompatible with the block C, the polymer (D) is compatible with the block C and incompatible with the block A, the resilient block B has a glass transition temperature below +20° C. and the blocks A, B and C are incompatible with one another.

13 Claims, No Drawings

MULTIPHASE POLYMER BLENDS

The present invention relates to multiphase polymer blends containing a) a polymer (A), b) an A—B block copolymer (B) composed of a block A and a resilient block B and c) a B—C block copolymer (C) composed of a resilient block B and a block C d) and at least one further polymer (D) which differs from (A),(B) and (C) and is incompatible with the polymer (A), wherein the blocks A, B and C are different from one another, the polymer (A) is compatible with the block A and incompatible with the block C, the polymer (D) is compatible with the block C and incompatible with the block A, the resilient block B has a glass transition temperature below +20° C. and the blocks A, B and C are incompatible with one another.

The present invention furthermore relates to the use of these molding materials for the production of moldings of any type and to the moldings produced therefrom.

Polymer blends serve in general for combining two different polymers having the desirable properties of the individual components, the undesirable properties as far as possible being compensated. This makes it possible to open up different applications with novel blend compositions.

However, macromolecular substances have a pronounced disinclination to mix with other polymers, so that blend compositions generally contain a compatibilizer.

Many problems in the preparation of polymer blends comprising a plurality of polymers which are incompatible with one another arise as a result of insufficient phase binding, ie. adhesion between the individual polymer phases. In order to achieve better phase binding, block or graft copolymers are frequently added to the components of the blend. In the polymer blends known to date, however, the phase binding is still not completely satisfactory. Moreover, the formation of voids at the boundaries of the individual polymer phases is observed during the processing of said blends and is due to the different coefficients of thermal expansion of the polymer phases. This has an adverse effect on the mechanical strength, in particular the toughness and the stress cracking resistance of the resulting polymer blends.

Furthermore, in the preparation of polymer blends it is frequently difficult to mix different polymers with one another in a suitable manner, since some important polymers, for example polyphenylene ethers (PPE), are only poorly compatible with other polymers. In such cases, a compatibilizer which is intended to improve the miscibility of two polymers exhibiting little compatibility is frequently used. In this context, JP-A 01/054 052 discloses, inter alia, the use of a copolymer of styrene and acrylonitrile and/or methacrylate for PPE/ABS blends. However, the blends obtained have unsatisfactory toughness and insufficient stress cracking resistance and joint line strength.

In the more recent document WO 93/03291, A—B—C three-block copolymers were proposed as compatibilizers for incompatible polymers.

It is an object of the present invention to provide multiphase polymer blends, in particular comprising poorly miscible polymers, which, as a result of a compatibilizer, give good blend compositions having good phase binding with a very large number of polymers. Said blends should have good heat distortion resistance in combination with very good toughness (in particular multiaxial impact strength) as well as stress cracking resistance and joint line strength.

We have found that this object is achieved by the multiphase polymer blends defined at the outset.

Preferred blends of this type and their use are described in the subclaims.

The novel polymer blends contain, in addition to a polymer (A), two two-block copolymers (B) and (C) which consist of a block A, a resilient block B having a glass transition temperature below +20° C., in particular below 0° C., and a block C, which differ from one another. Preferred multiphase polymer blends have a resilient block B of this type which is composed of a polymer of a conjugated diene. The novel polymer blends also contain at least one further polymer (D) which differs from (A), (B) and (C) and is incompatible with the polymer (A). Also important here is the fact that the polymer (A) is compatible with the block A and incompatible with the block C and the polymer (D) is compatible with the block C and incompatible with the block A and the blocks A, B and C are incompatible with one another. The polymer (A) may be structurally either identical to or different from the block A, provided only that the compatibility is ensured. Likewise, the polymer (D) may be structurally either identical to or different from the block C, provided that here too the compatibility is ensured. Furthermore, the block B of the AB block copolymer may be structurally either identical to or different from the B block of the B—C block copolymer, provided that here too the compatibility is ensured.

The mode of action of the A—B or B—C block copolymer in the novel polymer blends is based in particular on the fact that, in the case of simultaneous adhesion in the polymers (A) and (D) by means of the blocks A and C, a flexible, resilient intermediate phase in the form of 2 blocks B is formed. The anchoring in the polymer (A) is effected by the formation of loops of this polymer with the block A of the one block copolymer AB, while the adhesion in the polymer (D) is due to the penetration by the block C of the other block copolymer B—C. The flexible intermediate phases (blocks B) are capable of absorbing stresses between the phase boundaries and can help both to improve the miscibility and to increase the impact strength of the blend.

The question as to whether and under which conditions two polymers are miscible, ie. compatible, can frequently only be determined experimentally.

The compatibility of two polymer components is understood as meaning in general the miscibility of the components or the tendency of one polymer to dissolve in the other polymer component (cf. B. Vollmert, Grundriβ der makromolekularen Chemie, Volume IV, page 222 et seq., E. Vollmert-Verlag 1979).

Two polymers exhibit better compatibility the smaller the difference between their solubility parameters. Such parameters and the enthalpy of mixing cannot be determined in a standard manner for all polymers, so that the solubility can be determined only indirectly, for example by torsion-vibration or DTA measurements, since the steps characteristic for the individual components are absent in the case of copolymers.

A system of two or more polymers may be assumed to be miscible, ie. compatible, when said system fulfils at least one of the following criteria:

Optical transparency

A film of polymers which are compatible with one another appears optically transparent; however, if these polymers are incompatible, the film appears optically opaque. In case of doubt, the transparency can be determined by investigation under the electron microscope.

Glass transition temperature:

Polymers which are miscible with one another. ie. compatible, have only one glass transition temperature, which is between those of the starting polymers, on exposure to thermal stress (DTA or DSC measurements). In the case of partially compatible polymers, it is possible to detect two different glass transition temperatures, which however shift toward one another.

Nuclear magnetic resonance (NMR) relaxation:

A very sensitive method is the determination of the polymer miscibility by NMR relaxation time measurements. In the case of immiscible polymers, the spin-spin and spin-lattice relaxation times of the pure polymers are measured, while in the case of miscible polymers other relaxation times occur.

Other methods:

Other suitable methods which may be used for determining the miscibility of polymers are turbidity measurements, scattering methods (light scattering), IR spectroscopy and fluorescence techniques (L.A. Utracki, Polymer Alloys and Blends, pages 34–42, New York 1989).

Examples of polymers which are miscible with one another are documented in detail in various monographs (for example, J. Brandrup and E. H. Immergut: Polymer Handbook, 3rd Edition, 1989).

The block copolymers (B) and (C) contained in the novel polymer blends can be prepared by generally known methods, for example by sequential anionic polymerization (U.S. Pat. No. 3,251,905, U.S. Pat. No. 3,390,207, U.S. Pat. No. 3,598,887, U.S. Pat. No. 4,219,627).

If all two monomers cannot be subjected to anionic polymerization in the desired sequence, the procedure may be modified so that only one of the monomers is polymerized and the procedure is continued using other methods, for example by carrying out further polymerization by the free radical or cationic method. The possibilities for changing from anionic polymerization to other growth mechanisms are described, for example, in P. Rempp, E. Franta and J. E. Herz, Advances in Polymer Science 1988, pages 164–168.

Monomers which are capable only of polycondensation may also be introduced into such a two-block copolymer by adding during the polycondensation, for example, a block provided with a functional terminal group and prepared by anionic polymerization (R. N. Young, R. P. Quirk and L. J. Fetters, Advances in Polymer Science 56 (1984), 70).

Furthermore, the A—B block copolymers (B) or B—C block copolymers (C) may also be prepared by free radical polymerization with the aid of functional initiators or macroinitiators (G. Riess, G. Hurtrez and P. Bahadur, Encyclopedia of Polymer Science and Engineering, Vol. 2, 327–330, Wiley & Sons [1985].

Some examples of such block copolymers (B) and (C), which are particularly suitable for the purposes of the novel multiphase polymer blends, are described below. However, the novel multiphase polymer blends are of course not restricted to polymer blends which contain the block copolymers (B) and (C) mentioned below.

Examples of particularly suitable block copolymers (B) and (C) include:

A—B block copolymers (B) with polystyrene as block A, polybutadiene as the resilient block B, B—C block copolymers (C) with an identical resilient block B or polyisoprene as block B and polyhexamethyleneadipamide as block C. Such block copolymers are particularly suitable for multiphase polymer blends comprising polystyrene or polyphenylene ether as polymer (A) and polyamide 66 as polymer (D).

A—B block copolymers (B) with polystyrene as block A, polybutadiene as the resilient block B; B—C block copolymers (C) with an identical block B or polyisoprene as block B and poly-ε-caprolactone as block C. Such block copolymers are particularly suitable in a multiphase polymer blend with polystyrene or polyphenylene ether as polymer (A) and polyester or polyvinyl chloride as polymer (D).

A—B block copolymers (B) with polystyrene as block A, polybutadiene as the resilient block B; B—C block copolymers (C) with an identical block B or polyisoprene as block B and poly-ε-caprolactam as block C. These block copolymers are suitable for, inter alia, multiphase polymer blends comprising polystyrene or polyphenylene ether as polymer (A) and polyamide 6 as polymer (D).

A—B block copolymers (B) with polystyrene as block A, polybutadiene as the resilient block B; B—C block copolymers (C) with a structurally identical block B or polyisoprene as block B and polyethylene oxide as block C, preferably used in multiphase polymer blends comprising polystyrene as polymer (A) and polyethylene oxide or polyoxyphenylenesulfonylphenylene as polymer (D).

A—B block copolymers (B) with polymethyl methacrylate as block A, polybutadiene as the resilient block B; B—C block copolymers (C) with a structurally identical block B or polyisoprene as block B and polyhexamethyleneadipamide as block C, preferably used in multiphase polymer blends comprising polymethyl methacrylate, a styrene/acrylonitrile copolymer or an ABS copolymer as polymer (A) and polyamide 66 as polymer (D).

A—B block copolymers (B) with polymethyl methacrylate as block A, polybutadiene as the resilient block B; B—C block copolymers (C) with a structurally identical block B or polyisoprene as block B and poly-ε-caprolactam as block C, preferably used in multiphase polymer blends comprising polymethyl methacrylate, as styrene/acrylonitrile copolymer or an ABS copolymer as polymer (A) and polyamide 6 as polymer (D).

A further improvement of the interphase adhesion can be achieved by modifying the two block copolymers (B) and (C).

Usually, an unmodified block copolymer is modified by incorporating at least one carbonyl, carboxyl, anhydride, amido, imido, carboxylic ester, carboxylate, amino, hydroxyl, epoxy, oxazoline, urethane, urea, lactam, halobenzyl or 1,2,4-triazolin-3,5-dione group.

After the reaction, the modifier is present in the block copolymers in amounts of up to 10, preferably up to 5, % by weight, based in each case on (B) or (C).

Suitable modifiers are, for example, maleic acid, methylmaleic acid, itaconic acid, tetrahydrophthalic acid, anhydrides and imides thereof, fumaric acid, the mono- and diesters of these acids, for example with $C_1$- and $C_2$-$C_8$-alkanols, the mono- or diamides of these acids, such as N-phenylmaleimide and maleic hydrazide. Other examples are N-vinylpyrrolidone and (meth)acryloylcaprolactam. Another group of modifiers comprises, for example, the anhydride of acetic acid with 4-carboxybenzene-1,2-dicarboxylic anhydride, chloro-ethanoylsuccinaldehyde, chloroformylsuccinaldehyde, citric acid and hydroxysuccinic acid.

A particularly preferred modifier is 1,2,4-triazoline-3,5-dione itself or 1,2,4-triazoline-3,5-dione substituted in the 4-position, of the formula I

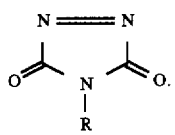

In this formula, R may be an alkyl, cycloalkyl, aryl, aralkyl or alkylaryl radical of up to 25 carbon atoms, a 5-membered to 8-membered heterocyclic structure containing nitrogen, oxygen or sulfur as a heteroatom or $NR^1R^2$, where $R^1$ and $R^2$ are each $C_1-C_4$-alkyl or in particular hydrogen.

R may furthermore be an alkenyl or alkynyl radical of 2 to 25 carbon atoms.

Very generally, R is preferably a radical of up to 15 carbon atoms.

Examples of alkyl radicals are methyl, ethyl, propyl, butyl, pentyl, hexyl, heptyl, octyl, nonyl, decyl, undecyl, dodecyl, neopentyl, 3,5,5-trimethylhexyl, 3-methylhexyl, 2-ethylhexyl and 2,5,5-trimethylhexyl.

An example of a cycloalkyl radical is cyclohexyl.

Examples of aralkyl radicals are benzyl and phenethyl.

Unsubstituted aryl radicals are, for example, phenyl and naphthyl. Substituted aryl radicals are alkylaryl, cycloalkylaryl, aryl-substituted alkylaryl and aryl-substituted aryl radicals.

Examples of alkylaryl radicals are o-, p- and m-tolyl and 2,6- and 2,4-dimethylphenyl. Trimethylphenyl, o-, p- and m-isopropylphenyl, nonylphenyl, p-tert-butylphenyl, 2,4-diisopropylphenyl and triisopropylphenyl.

An example of a cycloalkylaryl radical is o-cyclohexylphenyl. Examples of aryl-substituted alkylaryl radicals are p-benzylphenyl and p-phenethylphenyl.

An example of an aryl-substituted aryl is biphenyl.

Preferred radicals are phenyl, o-, m- and p-tolyl, 2,6-dimethylphenyl, 2,7-diisopropylphenyl and triisopropylphenyl, the compounds 4-methyl- and 4-phenyl-1,2,4-triazoline-3,5-dione being preferred.

The radical R which in turn is substituted by one or more functional groups is particularly preferred. Examples of suitable functional groups are halogen, nitrile, ether, nitro, phenolic OH—, carboxylic ester, carbonyl halide, carboxamido, anhydride, imido, lactam, epoxy, urethane, oxazoline, carbonyl, thioether, sulfonic ester, phosphate and amino groups; salts of carboxyl groups are also suitable. 4-Hydroxy-3-nitrophenyl and 4-carboxymethylphenyl may be mentioned by way of example.

Furthermore, the modification may also be carried out using molecules carrying more than one 1,2,4-triazoline-3,5-dione group. This leads in general to branched or crosslinked polymers. Components of the structure II

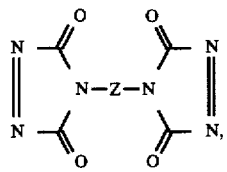

where Z is a bridging member, are preferred. A very suitable Z is —$(CH_2)_n$—where n is from 1 to 8.

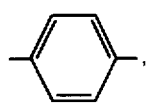

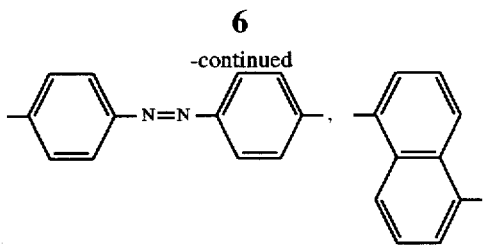

and preferably

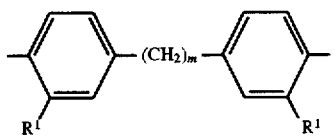

where m is from 2 to 8, preferably 1, and $R^1$ is H or $OCH_3$.

The compounds may be prepared, for example, according to DE-A 32 44 057 and DE-A 27 04 330, J. J. Stickler and W. H. Pirkle, J. Org. Chem., 31, (1966) 3444–45, or J. A. Moore, R. Muth and R. Sorace, J. Org. Chem., 39, (1974) 3799.

The reaction of the components is carried out either in the absence of a solvent, ie. in the melt of (B) and/or (C), or preferably in solution or in a suspension of (B) and/or (C) in a solvent for the modifier. In general, thorough mixing of the reactants is ensured by stirring.

Solvents particularly suitable for the reaction are those which dissolve both B and C and the modifier without interfering with the modification. Examples of suitable solvents are aromatic and chlorinated hydrocarbons, tetrahydrofuran, ethyl acetate and dimethylformamide.

The reaction can be carried out in a wide temperature range from –50° C. to the boiling point of the corresponding solvent, preferably from –20° C. to +80 C.

Preferred multiphase polymer blends contain a) from 10 to 89% by weight of the polymer (A)

b) from 0.5 to 25% by weight of the A—B block copolymer (B)

c) from 0.5 to 25% by weight of the B—C block copolymer (C)

d) from 10 to 89% by weight of the polymer (D).

Such multiphase polymer blends contain, as preferred polymer (A), from 10 to 89, preferably from 10 to 79, in particular from 15 to 50, % by weight of a polyphenylene ether.

The polyphenylene ethers generally have a weight average molecular weight of from 10,000 to 80,000, preferably from 20,000 to 60,000.

This corresponds to a reduced specific viscosity ($\eta$red) of from 0.2 to 0.9, preferably from 0.35 to 0.8, in particular from 0.45 to 0.6, dl/g, measured in a 0.5% strength by weight solution in chloroform at 25° C. according to DIN 53 726.

Suitable polyphenylene ethers are known per se and are preferably prepared by oxidative coupling of phenols disubstituted in ortho positions.

Examples of substituents are halogen, such as chlorine or bromine, and alkyl of 1 to 4 carbon atoms which preferably has no α tertiary hydrogen atom, eg. methyl, ethyl, propyl or butyl. The alkyl radicals may in turn be substituted by halogen, such as chlorine or bromine, or by hydroxyl. Further examples of possible substituents are alkoxy, preferably of up to 4 carbon atoms, and phenyl which is unsubstituted or substituted by halogen and/or by alkyl.

Copolymers of different phenols, for example copolymers of 2,6-dimethylphenol and 2,3,6-trimethylphenol, are also suitable. Mixtures of different polyphenylene ethers may of course also be used.

Preferably used polyphenylene ethers are those which are compatible with vinylaromatic polymers, ie. are completely or very substantially soluble in these polymers (cf. A. Noshay, Block Copolymers, pages 8 to 10, Academic Press, 1977, and O. Olabisi, Polymer-Polymer Miscibility, 1979, pages 117 to 189).

Examples of polyphenylene ethers are poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly (2-ethoxy-1, 4-phenylene ether), poly- (2-chloro-1, 4-phenylene ether) and poly(2,5-dibromo-1,4-phenylene ether). Preferably used polyphenylene ethers are those in which the substituents are alkyl of 1 to 4 carbon atoms, such as poly(2,6-dimethyl-1,4-phenylene ether), poly(2-methyl-6-ethyl-1,4-phenylene ether), poly(2-methyl-6-propyl-1,4-phenylene ether), poly (2,6-dipropyl-1,4-phenylene ether) and poly(2-ethyl-6-propyl-1,4-phenylene ether).

Graft polymers comprising polyphenylene ethers and vinylaromatic polymers, such as styrene, α-methylstyrene, vinyltoluene and chlorostyrene, and functionalized or modified polyphenylene ethers, as disclosed, for example, in WO-A 86/02086, WO-A 87/00540, EP-A-222 246, EP-A-223 116 and EP-A-254 048, are also suitable.

Up to 50, preferably up to 40, % by weight of the polymer (A) may be replaced by a vinylaromatic polymer.

The vinylaromatic polymer is preferably compatible with the polyphenylene ether used as polymer (A).

The molecular weight of these polymers which are known per se and commercially available is in general from 1,500 to 2,000,000, preferably from 70,000 to 1,000,000.

Examples of preferred vinylaromatic polymers compatible with polyphenylene ethers are described in the above-mentioned monograph by Olabisi, pages 224 to 230 and 245. Vinylaromatic polymers of styrene, chlorostyrene, α-methylstyrene and p-methylstyrene are mentioned here merely by way of typical examples; copolymers such as (meth)acrylonitrile or (meth)acrylates may also be present in the composition in minor amounts (preferably not more than 20, in particular not more than 8, % by weight). Particularly preferred vinylaromatic polymers are polystyrene and high-impact polystyrene. Mixtures of these polymers may of course also be used. The preparation is preferably carried out by the process described in EP-A-302 485.

The novel polymer blends contain, as block copolymers (B) and (C), from 0.5 to 25, preferably from 1 to 20, in particular from 2 to 10, % by weight of an A—B block copolymer and of a B—C block copolymer which are composed of a vinylaromatic block A and a conjugated diene as block B and a block C comprising $C_1$–$C_{18}$-alkyl esters of acrylic acid or $C_1$–$C_{18}$-alkyl esters of methacrylic acid or a mixture thereof.

Block copolymers are known to be understood as meaning copolymers in which the different monomers are not incorporated in the chain in a random manner but in which homopolymeric chain segments (polymer blocks) of the different monomers are linked to one another. In the case of two-block copolymers of the general formula A—B, the homopolymeric chain segment A is bonded to the homopolymeric chain segment B of another monomer.

In the A—B block copolymers B), the block A is compatible with the polyphenylene ether A) and the block C of the B—C block copolymer is compatible with the further polymer component D). The compatibility of two polymer components is understood as meaning in general the miscibility of the components or the tendency of one polymer to dissolve in the other polymer component (cf. B. Vollmert, Grundriβ der makromolekularen Chemie, Volume IV, page 222 et seq., E. Vollmert-Verlag 1979).

In the block copolymers (B) and (C) present in the novel polymer blends, the blocks A and C have a glass transition temperature greater than 0° C., preferably greater than 80° C. Block B has a glass transition temperature of less than 0° C., preferably less than −30° C.

The weight ratios of the blocks, based on the A—B block copolymer (B), are:

from 10 to 90, preferably from 20 to 80, and in particular from 30 to 70, % by weight of block A.

from 10 to 90, preferably from 20 to 80, and in particular from 30 to 70, % by weight of the resilient block B.

The weight ratios of the blocks, based on the B—C block copolymer (C), are from 10 to 90, preferably from 20 to 80, and in particular from 30 to 70, % by weight of the resilient block B.

from 10 to 90, preferably from 20 to 80, and in particular from 30 to 70, % by weight of block C.

The individual components of the block copolymers are described below:

Block A consists of a vinylaromatic polymer.

Examples of preferred vinylaromatic polymers compatible with polyphenylene ethers are described in the monograph by O. Olabisi, Polymer-Polymer Miscibility, 1979, pages 224 to 230 and 245.

Both homopolymers and copolymers of vinylaromatic monomers of 8 to 12 carbon atoms are suitable.

Suitable monovinylaromatic compounds are in particular styrene, as well as styrenes which are alkylated in the nucleus or side chain. Examples are chlorostyrene, α-methylstyrene, styrene, p-methylstyrene, vinyltoluene and p-tert-butylstyrene. However, styrene alone is preferably used.

Suitable comonomers for the preparation of copolymers are, for example, (meth)acrylic acid, alkyl (meth)acrylates where the alkyl radical is of 1 to 4 carbon atoms, acrylonitrile and maleic anhydride, as well as maleimides, acrylamide and methacrylamides and N,N- or N-alkyl-substituted derivatives where the alkyl radical is of 1 to 10 carbon atoms.

The comonomers are present in the styrene polymers in different amounts, depending on their chemical structure. The miscibility of the copolymer with the polyphenylene ether is critical with regard to the comonomer content of the polymer blend. Such miscibility limits are known and are described, for example, in U.S. Pat. No. 4,360,618 and U.S. Pat. No. 4,405,753 and in the publication by J. R. Fried and G. A. Hanna, Polymer Eng. Sci. 22 (1982), 705 et seq. The copolymers are prepared by known processes, which are described, for example, in Ullmanns Enzyklopädie der techn. Chemie, Volume 19, page 273 et seq., Verlag Chemie, Weinheim (1980). The copolymers generally have a weight average molecular weight ($M_w$) of from 10,000 to 500,000, preferably from 70,000 to 300,000, which can be determined by conventional methods.

The block B consists of a polymer of a conjugated diene of 4 to 16, preferably 4 to 8, carbon atoms.

Examples are 1,3-pentadiene, alkyl-substituted dienes, such as 2,3-dimethylbutadiene, or conjugated hexadienes, heptadienes and octadienes and cyclic dienes, such as cyclopentadiene, butadiene and isoprene being preferred.

Mixtures of the conjugated dienes may also be used for synthesizing the block B, any mixing ratio being possible.

The average molecular weight of block B may be varied within wide ranges and is not critical. However, it has proven advantageous if the molecular weight of B is about the same as or lower than that of the block A or C. The average molecular weight of polymer block B is obtainable, for example, by calculating the difference between the molecular weights of A and C and the average molecular weight of the A—B or B—C block copolymer.

It has also proven advantageous if the block length of the blocks A or C are about the same as or greater than that of the polymers (A) or (D) with which the particular blocks are compatible.

Suitable monomers which form the block C of the B—C copolymer are $C_1$–$C_{18}$-alkyl esters of methacrylic acid or acrylic acid or mixtures thereof.

According to the invention, the acrylic acid esters used are the $C_1$–$C_{18}$-alkyl esters, such as methyl, ethyl, n-propyl, isopropyl, n-butyl, isobutyl, sec-butyl, tert-butyl, pentyl, hexyl, heptyl, octyl, 2-ethylhexyl, nonyl, decyl, lauryl or stearyl acrylate, preferably methyl acrylate, n-butyl acrylate and 2-ethylhexyl acrylate, and mixtures of these monomers.

According to the invention, the methacrylic acid esters used are the $C_1$–$C_{18}$-alkyl esters, such as methyl, ethyl, n-propyl, iso-propyl, n-butyl, isobutyl, sec-butyl, tert-butyl, pentyl, hexyl, heptyl, octyl, 2-ethylhexyl, nonyl, decyl, lauryl or stearyl methacrylate, preferably methyl methacrylate, and mixtures of these monomers.

It is also possible to use methacrylates and acrylates having hydroxyl, epoxy and amino functional groups. It is advantageous to protect the functional groups by, for example, trialkylsilyl groups before the polymerization. Such polymerization processes in the presence of protective groups are described by S. Nakahama et al., Prog. Polym. Sci. 15 (1990), 299–335.

Up to 50, preferably from 1 to 20, % by weight of the following monomers, mentioned by way of example, may be used as further comonomers:

Vinylaromatics, such as styrene, alpha-methylstyrene, vinyltoluene or p-tert-butylstyrene;

p-Aminostyrene;

p-Hydroxystyrene;

p-Vinylbenzoic acid;

Acrylic and methacrylic acid;

Acrylamide and methacrylamide;

Maleic acid and the imides and $C_1$–$C_{10}$-alkyl esters thereof;

Fumaric acid and the imides and $C_1$–$C_{10}$-alkyl esters thereof;

Itaconic acid and the imides and $C_1$–$C_{10}$-alkyl esters thereof;

Acrylonitrile and methacrylonitrile;

Hydroxyalkyl (meth)acrylates.

The block copolymers (B) and (C) can be prepared by known methods of anionic block copolymerization, by sequential addition of the monomers or coupling techniques. Such processes are described in detail, for example,, in U.S. Pat. Nos. 3,251,905, 3,390,207, 3,598,887 and 4,219,627. Suitable initiators for the polymerization are organo-alkali metal compounds, preferably lithium alkyls, eg. methyllithium, ethyllithium, n-butyllithium, sec-butyllithium or isopropyllithium. n-Butyllithium or sec-butyllithium is particularly preferably used. Advantageous solvents for the polymerization are straight-chain or branched aliphatic hydrocarbons, eg. n-octane or n-hexane, and unsubstituted or substituted cycloaliphatic and aromatic hydrocarbons, eg. cyclohexane, methylcyclohexane, toluene or benzene, and any mixture of the aliphatic, cycloaliphatic and aromatic hydrocarbons. Cyclohexane is advantageously used as the solvent.

Other suitable solvent components are ethers, such as tetrahydrofuran or diethyl ether, and tertiary amines, eg. tetramethylethylenediamine or pyridine, in concentrations of from 0.01 to 20, preferably from 0.01 to 2, % by weight. Tetrahydrofuran is preferred.

All starting materials must be freed from impurities having active oxygen atoms or protons, which may be effected, for example, by bringing them into contact with metal organyls or by adsorptive purification, for example with calcium hydride. The polymerization is carried out under inert gas conditions at from $-100°$ to $+120°$ C., preferably from $-80°$ to $80°$ C. The pressures employed are those at which the monomers and solvents do not vaporize at the polymerization temperature. After the end of the polymerization, an amount of water, methanol or isopropanol, sufficient to deactivate the active terminal groups or excess initiator is added to the polymerization mixture.

In general, the procedure adopted is one in which, in a first polymerization stage, the vinylaromatic hydrocarbon is completely polymerized to form the A block and, in the second polymerization step, the diene hydrocarbon is completely reacted to form the B block. The result is sharp transitions between the individual blocks.

It is advantageous to block the living anion of the polydiene block by means of compounds carrying sterically hindered groups, such as diphenylethylene. As a result, the anion is prevented from attacking the ester group of the (meth)acrylate and, as desired, the reaction is continued virtually exclusively via the reactive double bond of the (meth)acrylates.

The block copolymers (B) and (C) thus obtained can be converted by conventional hydrogenation methods into polymers in which some of the aliphatic unsaturated bonds are saturated, ie. polymers which have a degree of hydrogenation of from 50 to 100, preferably from 70 to 100, in particular from 90 to 100, %.

It is also possible to employ A—B and B—C block copolymers which have a high degree of hydrogenation. If, however, modified A—B or B—C block copolymers are employed, it is advantageous for these to have a residual double bond content of from 1 to 10% by weight (prior to modification).

The hydrogenation is preferably carried out using molecular hydrogen and catalysts based on metals or metal salts of Group VIII of the Periodic Table. It may be effected in the heterogeneous phase, for example using Raney nickel, or preferably in the homogeneous phase using catalysts based on salts, in particular carboxylates, alkoxides or enolates of cobalt, of nickel or of iron, which are combined with the metal alkyls, in particular aluminum alkyls, or homogeneously by diimines produced in situ from, for example, tosyl hydrazide. Processes for the selective hydrogenation of block copolymers are described in, inter alia, U.S. Pat. Nos. 3,113,986 and 4,226,952.

In order to isolate the polymer, the polymerization mixture may be either directly heated to dryness or treated with steam, by means of known methods, the solvent being distilled off. It may also be precipitated in an excess of a nonsolvent, eg. ethanol, and separated off mechanically and dried or worked up by devolatilization in an extruder.

The residual double bond content is determined by Fourier analysis of the infrared spectra or by iodometric titration according to Wijs and by $^1$H-NMR spectroscopy.

The weight ratio of the monomers in the block copolymer (B) and (C) can be determined by conventional methods, for example by oxidative degradation of the unhydrogenated block copolymers with osmium tetroxide and gravimetric analysis, by IR spectroscopy or by determining the refractive index.

The average molecular weight of the block copolymer (B) and (C), which for the purposes of the present invention is understood as meaning the number average molecular weight, should be greater than 10,000, preferably greater than 50,000, in particular greater than 100,000. It is determined, as described below, by gel permeation chromatography.

In the characterization of the block copolymers (B) and (C), the following methods are used:

The average molecular weights M and molecular weight distributions (number average $M_n$, weight average $M_w$, U (nonuniformity)=$M_w/M_n-1$) are determined by gel permeation chromatography on the basis of calibration curves for polystyrene (calibration substances with very narrow molecular weight distribution: $M_w/M_n$ about 1) at 23° C. in 0.125% strength by weight tetrahydrofuran solution at a flow rate of 1.5 ml/min [cf. G. Glöckner, Polymercharakterisierung durch Flüssigkeitschromatographie", Verlag A. Hütig, Heidelberg, 1982].

The chemical composition and microstructure of the elastomeric middle block B (1,2 or 1,4 bonding or cis/trans contents of the diene in the block) are usually determined by $^1$H NMR spectroscopy. The glass transition temperatures are determined using dynamic mechanical analysis (frequency: 1 rad/s).

The novel polymer blends contain, as polymer (D), from 10 to 89, preferably from 20 to 80, in particular from 40 to 80, % by weight, based on the total weight of the polymers (A) to (D), of at least one further polymer (D) which differs from (A), (B) and (C).

The polymer (D) is not compatible with the polyphenylene ether used as polymer (A).

Examples of such polymers (D) are ASA or ABS or SAN polymers or polymers of $C_1$–$C_{18}$-alkyl esters of (meth) acrylic acid or mixtures of such polymers.

The mixing ratio of the polymers can be varied over wide ranges; however, when (meth)acrylates are mixed with ASA, ABS or SAN, it should be noted that these are miscible only to an acrylonitrile content of up to 27% by weight (up to 250° C.) or up to 25% by weight (up to 300° C.), based on the total content of, for example, ABS.

Preferred ASA polymers are composed of a flexible or rubber phase comprising a graft polymer of $D_1$ from 50 to 90% by weight of a grafting base based on $D_{11}$ from 95 to 99.9% by weight of a $C_2$–$C_{10}$-alkyl acrylate and $C_{12}$ from 0.1 to 5% by weight of a difunctional monomer having two olefinic, nonconjugated double bonds and $D_2$ from 10 to 50% by weight of a grafting base comprising $D_{21}$ from 20 to 50% by weight of styrene or a substituted styrene of the general formula I or a mixture thereof and $D_{22}$ from 10 to 80% by weight of acrylonitrile, methacrylonitrile, an acrylate or a methacrylate or a mixture thereof, as a mixture with a rigid matrix based on an SAN copolymer $C_3$) comprising:

$D_{31}$ from 50 to 90, preferably from 55 to 90, in particular from 65 to 85, % by weight of styrene and/or substituted styrenes of the general formula I and $D_{32}$ from 10 to 50, preferably from 10 to 45, in particular from 15 to 35, % by weight of acrylonitrile and/or methacrylonitrile.

The component $D_1$) is an elastomer which has a glass transition temperature of less than –20° C., in particular less than –30° C.

For the preparation of the elastomer, acrylic acid esters of 2 to 10, in particular 4 to 8, carbon atoms are used as main monomers $D_{11}$). Examples of particularly preferred monomers here are tert-butyl, isobutyl and n-butyl acrylate and 2-ethylhexyl acrylate, among which the two last-mentioned are particularly preferred.

In addition to these esters of acrylic acid, from 0.1 to 5, in particular from 1 to 4, % by weight, based on the total weight $D_{11}+D_{12}$, of a polyfunctional monomer having at least two olefinic, nonconjugated double bonds are used. Among these, difunctional compounds, ie. having two nonconjugated double bonds, are preferably used. Examples of these are divinylbenzene, diallyl fumarate, diallyl phthalate, triallyl cyanurate, triallyl isocyanurate, tricyclodecenyl acrylate and dihydrodicyclopentadienyl acrylate, among which the last two are particularly preferred.

Processes for the preparation of the grafting base $D_1$ are known per se and are described, for example, in DE-B 1 260 135. Corresponding products are also commercially available.

It has proven particularly advantageous in some cases to carry out the preparation by emulsion polymerization.

The exact polymerization conditions, in particular the type, metering and amount of emulsifier, are preferably chosen so that the latex of the acrylate, which is partially or completely crosslinked, has an average particle size (weight average $d_{50}$) of from about 200 to 700 nm, in particular from 250 to 600 nm. The latex preferably has a narrow particle size distribution, ie. the quotient $$Q = \frac{d_{90} - d_{10}}{d_{50}}$$

is preferably less than 0.5, in particular less than 0.35.

The proportion of the grafting base $D_1$ in the graft polymer $D_1+D_2$ is from 50 to 90, preferably from 55 to 85, and in particular from 60 to 80, % by weight, based on the total weight of $D_1+D_2$.

A graft shell $D_2$ which is obtainable by copolymerization of $D_{21}$ from 20 to 90, preferably from 30 to 90, and in particular from 30 to 80, % by weight of styrene or a substituted styrene of the general formula I

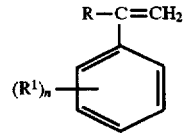

where R is alkyl of 1 to 8 carbon atoms, hydrogen or halogen, $R^1$ is alkyl of 1 to 8 carbon atoms or halogen and n is 0, 1, 2 or 3, and $D_{22}$ from 10 to 80, preferably from 10 to 70, in particular from 20 to 70, % by weight of acrylonitrile, methacrylonitrile, an acrylate or a methacrylate or a mixture thereof, is grafted onto the grafting base $D_1$.

Examples of substituted styrenes are α-methylstyrene, p-methylstyrene, p-chlorostyrene and p-chloro-α-methylstyrene, among which styrene and α-methylstyrene are preferred.

Preferred acrylates and methacrylates are those whose homopolymers and copolymers with the other monomers of component $D_{22}$) have glass transition temperatures of more than 20° C.; in principle, however, other acrylates may also be used, preferably in amounts such that the resulting glass transition temperature $T_g$ for component $D_2$ as a whole is above 20° C.

Esters of acrylic or methacrylic acid with $C_1$–$C_8$-alcohols and epoxy-containing esters, such as glycidyl acrylate or glycidyl methacrylate, are particularly preferred. Very particularly preferred examples are methyl methacrylate, tert-butyl methacrylate, glycidyl methacrylate and n-butyl acrylate, the last-mentioned compound, owing to its property of forming polymers having a very low $T_g$, preferably being used in not too large an amount.

The graft shell $D_2$) may be prepared in one process step or in a plurality of process steps, for example two or three such steps, the overall composition remaining unaffected thereby.

The graft shell is preferably prepared in emulsion, as described, for example, in German Patent 1,260,135 and in German Laid-Open Applications DOS 3,227,555, DOS 3,149,357 and DOS 3,414,118.

Depending on the conditions chosen, a certain proportion of free copolymers of styrene or substituted styrene derivatives and (meth)acrylonitrile or (meth)acrylates is formed during the graft copolymerization.

The graft copolymer $D_1+D_2$ generally has an average particle size of from 100 to 1,000 nm, in particular from 200 to 700 nm ($d_{50}$ weight average). The conditions during the preparation of the elastomer $D_1$) and during the grafting are therefore preferably chosen so that particle sizes in this range result. Relevant measures are known and are described, for example, in German Patent 1,260,135, German Laid-Open Application DOS 2,826,925 and J. Appl. Polym. Sci. 9 (1965), 2929–2938. The particle size of the latex of the elastomer can be increased, for example, by means of agglomeration.

For the purposes of the present invention, the free, ungrafted homo- and copolymers formed in the graft copolymerization for the preparation of the component $D_2$) are also counted as the graft polymer ($D_1+D_2$).

Some preferred graft polymers are listed below:

1. 60% by weight of grafting base $D_1$ comprising
   $D_{11}$ 98% by weight of n-butyl acrylate and
   $D_{12}$ 2% by weight of dihydrodicyclopentadienyl acrylate and
   40% by weight of graft shell $D_2$ comprising
   $D_{21}$ 75% by weight of styrene and
   $D_{22}$ 25% by weight of acrylonitrile
2. Grafting base as for 1, with 5% by weight of a first graft shell comprising styrene and
   35% by weight of a second graft comprising
   $D_{21}$ 75% by weight of styrene and
   $D_{22}$ 25% by weight of acrylonitrile
3. Grafting base as for 1, with 13% by weight of a first graft comprising styrene and 27% by weight of a second graft comprising styrene and acrylonitrile in a weight ratio of 3:1

The products contained as component $D_3$) may be prepared, for example, by the process described in German Published Applications DAS 1,001,001 and DAS 1,003,436.

Such copolymers are also commercially available. The weight average molecular weight determined by light scattering is preferably from 50,000 to 500,000, in particular from 100,000 to 250,000.

The weight ratio ($D_1+D_2$):$D_3$ is from 1:2.5 to 2.5:1, preferably from 1:2 to 2:1, in particular from 1:1.5 to 1.5:1.

Suitable SAN polymers as component D) are described above (cf. $D_{31}$ and $D_{32}$).

The viscosity number of the SAN polymers, measured according to DIN 53 727 as a 0.5% strength by weight solution in dimethylformamide at 23° C., is in general from 40 to 100, preferably from 50 to 80, ml/g.

ABS Polymers as polymer (D) in the novel multiphase polymer blends have the same structure as described above for ASA polymers. Instead of the acrylic rubber $D_1$) of the grafting base in the ASA polymer, conjugated dienes, as described above for the structure of the block B of the AB copolymer, are usually used, so that the grafting base $D_4$ preferably has the following composition:
$D_{41}$ from 70 to 100% by weight of a conjugated diene and
$D_{42}$ from 0 to 30% by weight of a difunctional monomer having two olefinic nonconjugated double bonds.

Grafting base $D_2$ and the rigid matrix of the SAN copolymer $D_3$) remain unchanged in the composition. Such products are commercially available. The preparation processes are known to a person skilled in the art, so that further information in this context is superfluous.

The weight ratio ($D_4+D_2$):$D_3$ is from 3:1 to 1:3, preferably from 2:1 to 1:2.

Another suitable polymer (D) in the novel multiphase polymer blends is a polymer of a $C_1$–$C_{18}$-alkyl ester of (meth)acrylic acid or of a mixture thereof, as described above for the structure of block C of the B—C block copolymer.

The novel polymer blends may also contain conventional additives and processing assistants. The proportion of these additives is in general not more than 60, in particular not more than 50, very particularly not more than 30, % by weight, based on the total weight of the polymers (A) to (D) and these additives and assistants.

Examples of additives are heat stabilizers, light stabilizers, lubricants, mold release agents and colorants, such as dyes and pigments, in conventional amounts. Further additives are reinforcing agents, such as glass fibers, asbestos fibers, carbon fibers and aromatic polyamide fibers, and/or fillers, gypsum fibers, synthetic calcium silicates, kaolin, calcined kaolin, wollastonite, talc and chalk.

Low molecular weight or high molecular weight polymers are also suitable additives, polyethylene wax being a particularly preferred lubricant.

Examples of suitable pigments are $TiO_2$ and carbon blacks.

When $TiO_2$ is used, the average particle size is 50–400 nm, in particular 150–240 nm. Rutile and anatase, which may be coated with metal oxides, for example alumina, silicas, oxides of zinc or siloxanes, are used industrially.

Carbon blacks are to be understood as meaning microcrystalline, finely divided carbons (cf. Kunststofflexikon, 7th Edition 1980).

Suitable examples are furnace blacks, acetylene blacks, gas blacks and the thermal carbon blacks obtainable by thermal preparation.

The particle sizes are preferably from 0.01 to 0.1 μm and the surface areas are from $10_2$ to $10_4$ m²/g (BET/ASTM D 3037), the DBP absorptions being from $10_2$ to $10_3$ ml/100 g (ASTM D 2414).

Phosphorus-containing compounds in amounts of up to 20, preferably up to 10, % by weight, may be used in particular as additional flameproofing agents. Examples of these are phosphoric esters, phosphinic esters, phosphine oxides, phosphorus and organic phosphates, which may be used in combination with a triazine derivative or polytetrafluoroethylene.

The desired properties of the end products can be controlled to a considerable extent through the type and amount of these additives.

The novel multiphase polymer blends are advantageously prepared by mixing the polymers (A), (B), (C) and (D) at from 200 to 320° C. in a conventional mixing apparatus, for example a kneader, a Banbury mixer or a single-screw extruder, preferably a twin-screw extruder. In order to obtain a very homogeneous molding material, thorough mixing is necessary. The order in which the polymers are mixed may be varied; two, or, if necessary, three polymers may be premixed or all polymers may be mixed together. The novel polymer blends may also be prepared from solution in suitable solvents.

In a preferred method for preparing the polymer blends, the individual polymers are dissolved in an organic solvent, for example tetrahydrofuran or CHCl$_3$/toluene, at from 20° to 70° C., preferably from 30° to 60° C. After the individual polymers have been dissolved and thoroughly mixed, the mixture is precipitated with an excess of an alcohol, eg. methanol, the solvent is separated off and the polymer blend is dried at elevated temperatures under reduced pressure.

The test specimens are usually produced by compression molding of the melt in suitable compression molds at from 200° to 320° C.

Moldings having good phase binding can be prepared from the novel polymer blends also, for example, by injection molding or extrusion. These moldings have very good heat distortion resistance in combination with very good toughness and improved stress cracking resistance and joint flowing strength. In particular, such moldings exhibit very high deformability before ductile fracture occurs.

As a result of this property spectrum, the moldings which can be prepared from the novel polymer blends are particularly suitable for applications in, for example, automotive construction, the household sector and other components (housings).

EXAMPLES

I. Preparation of the Block Copolymers

1. Purification of the monomers:

All operations were carried out under nitrogen.

Styrene:

Styrene was purified by predrying over finely powdered calcium hydride. For final purification, the styrene was degassed on a high vacuum line and recondensed. Before the condensation into the monomer burette, dibutylmagnesium was added to 100 g of styrene and the mixture was stirred for three hours.

Butadiene:

100 g of butadiene and 10 ml of a 0.5 molar solution of dibutylmagnesium in heptane were initially taken in a conventional pressure vessel. The solvent was removed under reduced pressure. Butadiene was introduced by condensation from the storage bottle and was stirred for at least three hours at room temperature.

1.1-Diphenylethylene:

A 12% strength solution of secondary butyllithium in cyclohexane/isopentane was added to 1,1-diphenylethylene in an amount sufficient to result in the formation of the characteristic deep red color of the anion. The further purification was carried out by fractional distillation.

Methyl Methacrylate:

Methyl methacrylate was predried over calcium hydride. The final purification was carried out by degassing and recondensation under greatly reduced pressure. Before condensation into the monomer burette, triethylaluminum was added to the methyl methacrylate. About 5 ml of a 1.0 molar solution of triethylaluminum in hexane were used per 100 ml of hexane.

The purified and destabilized monomers styrene and methyl methacrylate were stored at liquid nitrogen temperature until required for use.

Purification of the solvent:

Technical grade tetrahydrofuran was refluxed for 6 hours with finely powdered calcium hydride. It was then distilled off in a second distillation apparatus. The tetrahydrofuran was refluxed with potassium until the required purity had been reached. The relevant criterion was the immediate formation of the red anion of 1,1-diphenylethylene on addition of butyllithium to a sample of the tetrahydrofuran to which a little 1,1-diphenylethylene had been added.

2. Anionic Polymerization of the A—B block copolymer (B)

3 l of cyclohexane were initially taken under inert gas in a 6 l reaction vessel and heated to 40° C. The impurities in the solvent were titrated with the initiator sec-butyllithium solution (1.5 molar) and, at the end of the titration, a further 1.5 ml of the initiator solution were added. After the addition of 121 g of styrene, the mixture was heated to 60° C. After 2 hours, the polymerization of the styrene block A was complete.

The reaction mixture was cooled to 20° C., and 121 g of isoprene were added. After the end of the polymerization, the reaction was stopped with methanol and the polymer was precipitated with water.

Analysis of the block copolymer (B) by means of GPC, NMR and elemental analysis gave a total molecular weight of 105,000. The composition was 50% by weight of polystyrene and 50% by weight of polyisoprene. The 1,4 fraction was 88%.

3. Anionic polymerization of the B—C Block Copolymer (C)

3 of tetrahydrofuran were initially taken under inert gas in a 6 reaction vessel. At −20° C., the impurities were titrated with a 1.5 molar sec-butyllithium solution (initiator), and 1.5 ml of initiator solution were then added. 121 g (183 ml) of butadiene were introduced with condensation, and polymerization was effected in the course of 6 hours. Thereafter, 1.2 ml of 1,1-diphenylethylene were added (blocking of the polybutadiene block) and the mixture was cooled to −40° C. 125 g of methyl methacrylate were added and, after 2 hours, the reaction was stopped with small amounts of methanol and the polymer was precipitated. The following values were determined by analysis by means of GPC, NMR and elemental analysis:

Total molecular weight: 110,000 52% by weight of polymethyl methacrylate 48% by weight of polybutadiene 1,2 fraction of the polybutadiene block: 90%

II. Preparation of the Multiphase Polymer Blends

The following components were used:

Polymer (D)

An SAN copolymer obtainable by continuous solution polymerization and comprising styrene and acrylonitrile in a weight ratio of 80/20 (VN: 83 ml/g, measured according to DIN 53 727 as a 0.5% strength by weight solution in dimethylformamide at 23° C.).

Polymer (A)

Poly(2,6-dimethyl-1,4-phenylene ether) having a specific viscosity (η) of 55 ml/g (1% strength by weight in chloroform at 23° C. according to DIN 53 728).

Polymer (B1)

A modified polystyrene/isoprene two-block copolymer (as described under 2.) containing 4% by weight of 5-(3,5-dioxo-1,2,4-triazolin-4-yl)isophthalic acid (obtainable by the method in the dissertation by J. Hellmann, Johannes-Gutenberg University, Mainz 1991).

The modification of the block copolymer was carried out as follows:

The block copolymer and the modifier were purified by reprecipitation and were dried. The modifier (20 g) was dissolved in dry ethyl acetate (200 ml). The block copolymer (500 g) was dissolved in 5 l of tetrahydrofuran to give a 5% strength solution, and the solution of the modifier was added (at 20° C.). As soon as the solution had become decolorized, the modified polymer was precipitated in isopropanol, filtered and dried.

Polymer (B2)

A modified polystyrene/isoprene two-block copolymer (as described under 2.) containing 4% by weight of 4-(3,5-dioxo-1,2,4-triazolin-4-yl)benzoic acid (obtainable by the method in C. Hilger and R. Stadler, Makromolekulare Chemie 191 (1990) 1347 et seq.).

The modification was carried out similarly to the method of preparation as described for polymer (B1).

Polymer (C1)

A modified polybutadiene/methyl methacrylate two-block copolymer (as described under 3.) containing 4% by weight of 5-(3,5-dioxo-1,2,4-triazolin-4-yl)isophthalic acid.

The modification was carried out similarly to the method of preparation as described for polymer (B1).

Polymer (C2)

A modified polybutadiene/methyl methacrylate two-block copolymer (as described under 3.) containing 4% by weight of 4-(3,5-dioxo-1,2,4-triazolin-4-yl)benzoic acid.

The modification was carried out as described for polymer (B1).

Preparation of the polymer blends:

The products were compounded according to the ratios stated in Table 1, in a twin-screw extruder (ZSK 30, from Werner & Pfleiderer) at 280° C. and 200 rpm. The product was extruded, passed through a waterbath, granulated, dried and injection molded (280° C.) to give the appropriate standard test specimens.

The total penetration energy $W_t$ according to DIN 53 443 was determined for the standard test specimens.

Molecular weights and molecular weight distributions ($M_n$=number average, $M_w$=weight average, $U=M_w/M_n-1$) were determined by gel permeation chromatography against polystyrene calibration standards (cf. description, page 16). The chemical composition and the microstructure of the polybutadiene middle block were determined by $^1$H-NMR spectroscopy (apparatus: AC 300 from Bruker).

The results of the measurements and the composition of the moldings are shown in the table.

TABLE

| Example | Polymer (A) [% by wt.] | Polymer (D) [% by wt.] | Polymer (B1/C1) [% by wt.] | $W_t$ [Nm] |
|---|---|---|---|---|
| 1 | 38 | 58 | 2/2 | 5 |
| 2 | 35 | 55 | 5/2 | 13 |
| 3 | 30 | 50 | 10/10 | 21 |
| 4*) | 40 | 60 | — | <1 |

| | Polymer (A) [% by wt.] | Polymer (D) [% by wt.] | Polymer (B2/C2) [% by wt.] | $W_t$ [Nm] |
|---|---|---|---|---|
| 5 | 30 | 50 | 10/10 | 16 |

*)for comparison

We claim:

1. A multiphase polymer blend containing
   a) as a polymer (A) a polyphenylene ether or a mixture of a polyphenylene ether and up to 50% by weight, based on (A), of a vinylaromatic polymer, and
   b) an A—B block copolymer (B) composed of a block A and a resilient block B, and
   c) a B—C block copolymer (C) composed of a resilient block B and a block C, and
   d) at least one further polymer (D) which differs from (A), (B), and (C), and is incompatible with the polymer (A), said polymer (D) being selected from a group consisting of ASA-, and ABS-, and SAN-polymers, and polymers of $C_1$–$C_{18}$-alkyl esters of (meth)acrylic acid, where the SAN-polymer in turn comprises from 50 to 90% by weight of styrene or substituted styrenes of the formula I $$R-C=CH2$$
$$(R1)n-\text{phenyl}$$  (I)

where R is alkyl of 1 to 8 carbon atoms, hydrogen or halogen, $R^1$ is alkyl of 1 to 8 carbon atoms or halogen, and n is 0, 1, 2, or 3, or a mixture thereof, wherein the blocks A, B, and C are different from one another, the polymer (A) is compatible with the block A and incompatible with the block C, the polymer (D) is compatible with the block C and incompatible with the block A, the resilient block B has a glass transition temperature below +20° C., and the blocks A, B, and C are incompatible with one another.

2. A multiphase polymer blend as claimed in claim 1, containing
   a) from 10 to 89% by weight of polymer (A)
   b) from 0.5 to 25% by weight of the A—B block copolymer (B)
   c) from 0.5 to 25% by weight of the B—C block copolymer (C)
   d) from 10 to 89% by weight of the polymer (D).

3. A multiphase polymer blend as claimed in claim 1, wherein the resilient block B has a glass transition temperature below 0° C.

4. A multiphase polymer blend as claimed in claim 1 wherein the components (B) and (C) are obtainable by sequential anionic polymerization.

5. A multiphase polymer blend as claimed in claim 1, in which the polymer (A) is a polyphenylene ether, up to 50% by weight, based on (A), of which may, if required, be replaced by a vinylaromatic polymer, the A—B block copolymer (B) being composed of a vinylaromatic block A and a conjugated diene as block B.

6. A multiphase polymer blend as claimed in claim 1, in which the polymer (A) is a polyphenylene ether, up to 50% by weight, based on (A), of which may, if required, be replaced by a vinylaromatic polymer, the B—C block copolymer (C) is composed of a conjugated diene as block B and a block C comprising a $C_1$-$C_{18}$-alkyl ester of acrylic acid or a $C_1$-$C_{18}$- alkyl ester of methacrylic acid or a mixture thereof.

7. A multiphase polymer blend as claimed in claim 1, in which the A—B block copolymer (B) or the B—C block copolymer (C) or a mixture thereof is modified by incorporating at least one carbonyl, carboxyl, anhydride, amido, imido, carboxylic ester, carboxylate, amino, hydroxyl, epoxy, oxazoline, urethane, urea, lactam, halobenzyl or 1,2,4-triazoline-3,5-dione group.

8. A multiphase polymer blend as claimed in claim 7, in which the modifier is present in the component (B) or (C) in amounts of up to 10% by weight, based in each case on (B) or (C).

9. A molding obtainable from a multiphase polymer blend as claimed in claim 1.

10. The multiphase polymer blend of claim 1, wherein the polymer (D) is an ASA polymer composed of a flexible or rubber phase comprising a graft polymer of $D_1$ from 50 to 90% by weight of a grafting base based on
  $D_{11}$ from 95% to 99.9% by weight of a $C_2$-$C_{10}$-alkyl acrylate, and
  $D_{12}$ from 0.1 to 5% by weight of a difunctional monomer having two olefinic, nonconjugated double bonds, and $D_2$ from 10 to 50% by weight of a grafting base comprising
  $D_{21}$ from 20 to 50% by weight of styrene or a substituted styrene of the formula I as set forth in claim 13, and
  $D_{22}$ from 10 to 80% by weight of acrylonitrile, methacrylonitrile, an acrylate or a methacrylate or a mixture thereof, as a mixture with a rigid matrix based on an SAN-copolymer $D_3$ comprising
  $D_{31}$ from 50 to 90% by weight of styrene and/or substituted styrenes of the formula I, and
  $D_{32}$ from 10 to 50% by weight of acrylonitrile and/or methacrylonitrile.

11. The multiphase polymer blend of claim 1, wherein the polymer (D) is an SAN polymer composed of from 50 to 90% by weight of styrene and/or substituted styrenes of the formula I, and from 10 to 50% by weight of acrylonitrile and/or methacrylonitrile.

12. The multiphase polymer blend of claim 1, wherein the polymer (D) is an ABS polymer composed of a flexible or rubber phase comprising a graft polymer of $D_4$ from 50 to 90% by weight of a grafting base based on
  $D_{41}$ from 70% to 100% by weight of a conjugated diene, and
  $D_{42}$ from 0 to 30% by weight of a difunctional monomer having two olefinic, nonconjugated double bonds, and $D_2$ from 10 to 50% by weight of a grafting base comprising
  $D_{21}$ from 20 to 50% by weight of styrene or a substituted styrene of the formula I as set forth in claim 13, and
  $D_{22}$ from 10 to 80% by weight of acrylonitrile, methacrylonitrile, an acrylate or a methacrylate or a mixture thereof, as a mixture with a rigid matrix based on an SAN-copolymer $D_3$ comprising
  $D_{31}$ from 50 to 90% by weight of styrene and/or substituted styrenes of the formula I, and
  $D_{32}$ from 10 to 50% by weight of acrylonitrile and/or methacrylonitrile.

13. A process for the preparation of moldings wherein a multiphase polymer blend obtained by mixing the polymers (A), (B), (C) and (D) as defined in claim 1 at from 200° C. to 320° C. and the mixture is melted and compressed.

* * * * *

UNITED STATES PATENT AND TRADEMARK OFFICE
CERTIFICATE OF CORRECTION

PATENT NO.: 5,750,621

DATED: May 12, 1998

INVENTOR(S): GOTTSCHALK et al.

It is certified that error appears in the above-identified patent and that said Letters Patent is hereby corrected as shown below:

Col. 20, claim 12, line 26, "13" should be --1--.

Signed and Sealed this

Sixth Day of October, 1998

Attest:

BRUCE LEHMAN

Attesting Officer

Commissioner of Patents and Trademarks